United States Patent [19]
O'Shea et al.

[11] 3,805,482
[45] Apr. 23, 1974

[54] PACKAGING MACHINE
[75] Inventors: Ronald J. O'Shea, Somerville; Bernd W. Haase, Berkeley Heights; Albert W. Hawkins, Princeton, all of N.J.
[73] Assignee: Union Carbide Corporation, New York, N.Y.
[22] Filed: Dec. 29, 1971
[21] Appl. No.: 213,429

[52] U.S. Cl. ................................................ 53/120
[51] Int. Cl. ............................................ B65b 63/04
[58] Field of Search .............................. 53/120, 117

[56] References Cited
UNITED STATES PATENTS
| | | | |
|---|---|---|---|
| 3,656,271 | 4/1972 | O'Shea et al. | 53/120 X |
| 2,030,880 | 2/1936 | Kleineberg | 53/120 |
| 3,640,050 | 2/1972 | Nystrand et al. | 53/120 |

Primary Examiner—Travis S. McGehee
Attorney, Agent, or Firm—Franklyn Schoenberg

[57] ABSTRACT

Apparatus and method are provided for automatically loading a desired quantity of flat, flexible articles into dispensing cartons which comprises, in combination, a stack depositing station comprising means for depositing an aligned stack of articles on a conveying means; a carton loading station associated with said stack depositing station and aligned with a conveying means; conveying means comprising a movably mounted endless belt that forms a substantially horizontal movable platform surface extending between said stack depositing station and said carton loading station; means for automatically folding an aligned stack of flexible articles positioned on said conveying means; and means for automatically stuffing a folded stack of flexible articles on said conveying means at said carton loading station into an empty carton.

6 Claims, 14 Drawing Figures

PACKAGING MACHINE

This invention relates to packaging machines and more particularly to apparatus for loading stacks of flat, flexible articles into dispensing cartons.

Film and sheet materials made from various plastic polymers such as polyethylene, polyvinyl chloride, polyesters and the like are enjoying wide popularity for many applications. These materials, even in their film form, are strong, highly transparent, sanitary and relatively inexpensive which lends them well for use as a packaging medium. Consequently, some of the most important uses of plastic film are in the production of wrappers for food such as sandwich bags, lunch bags, food storage bags and the like. Numerous other important uses have been made of plastic film, as, for example, in trash collection such as waste basket bags, trash bags and the like.

However, because of the extreme thinness of the material, the generally relatively small size of the article fabricated and its slippery nature, discrete sheets, either alone or in the form of bags, are somewhat difficult to package particularly when fabricated in large quantities using high speed automated machinery.

In accordance with the present invention, it has been discovered that a large number of flat, flexible articles can be rapidly packaged in dispensing cartons, each carton containing a desired quantity of articles, by apparatus which comprises, in combination, a stack depositing station comprising means for depositing an aligned stack of flat, flexible articles on a conveying means; a carton loading station associated with said stack depositing station and aligned with a conveying means; conveying means comprising a substantially horizontal movable platform surface extending between said stack depositing station and said carton loading station, said platform surface having at least one aperture therethrough; means for automatically folding an aligned stack of flat flexible articles positioned on said conveying means; and means for automatically stuffing a folded stack of flexible articles positioned on said conveying means at said carton loading station into an empty carton.

In one embodiment, the apparatus of the present machine comprises a stack collector mounted adjacent to and aligned with a completed bag dispensing means associated with a high speed bag-forming machine, said stack collector mounted with vibratory means and having an openable bottom closure whereby completed bags dispensed from a bag-forming machine enter said stack collector and are deposited in an aligned stack on the openable bottom closure. A plurality of spaced, parallel driven endless belts that form a substantially horizontal movable platform are movably mounted immediately beneath and in vertical alignment with said stack collector and extend therefrom to a carton loading station associated with said stack collector whereby an aligned stack of bags deposited on said belts by said stack collector may be conveyed to a carton loading station. The apparatus also is provided with a stiffening member depositing station intermediate said stack collecting station and a carton loading station comprising means for automatically depositing a stiffening member over a portion of an aligned stack of bags positioned on said spaced parallel endless belts. Also provided are means for automatically folding an aligned stack of bags about a stiffening member deposited over a portion of said stack of bags, means for conveying an empty carton to a carton loading station from a continuous conveyor of empty cartons, said empty carton being stationed immediately beneath and in vertical alignment with a chute extending downwardly between said spaced parallel endless belts; means for folding and stuffing said folded stack of bags into said empty carton; and means for conveying the filled carton.

The apparatus of the present invention is particularly well suited for use with high speed bag-forming apparatus and is readily adaptable for the packaging of a wide range of sizes of articles.

The apparatus and method of the present invention will become apparent from the following description thereof when considered together with the accompanying drawing which is set forth as being exemplary of one or more embodiments of the present invention and is not intended in any way to be limitative thereof and wherein:

Figure 1:
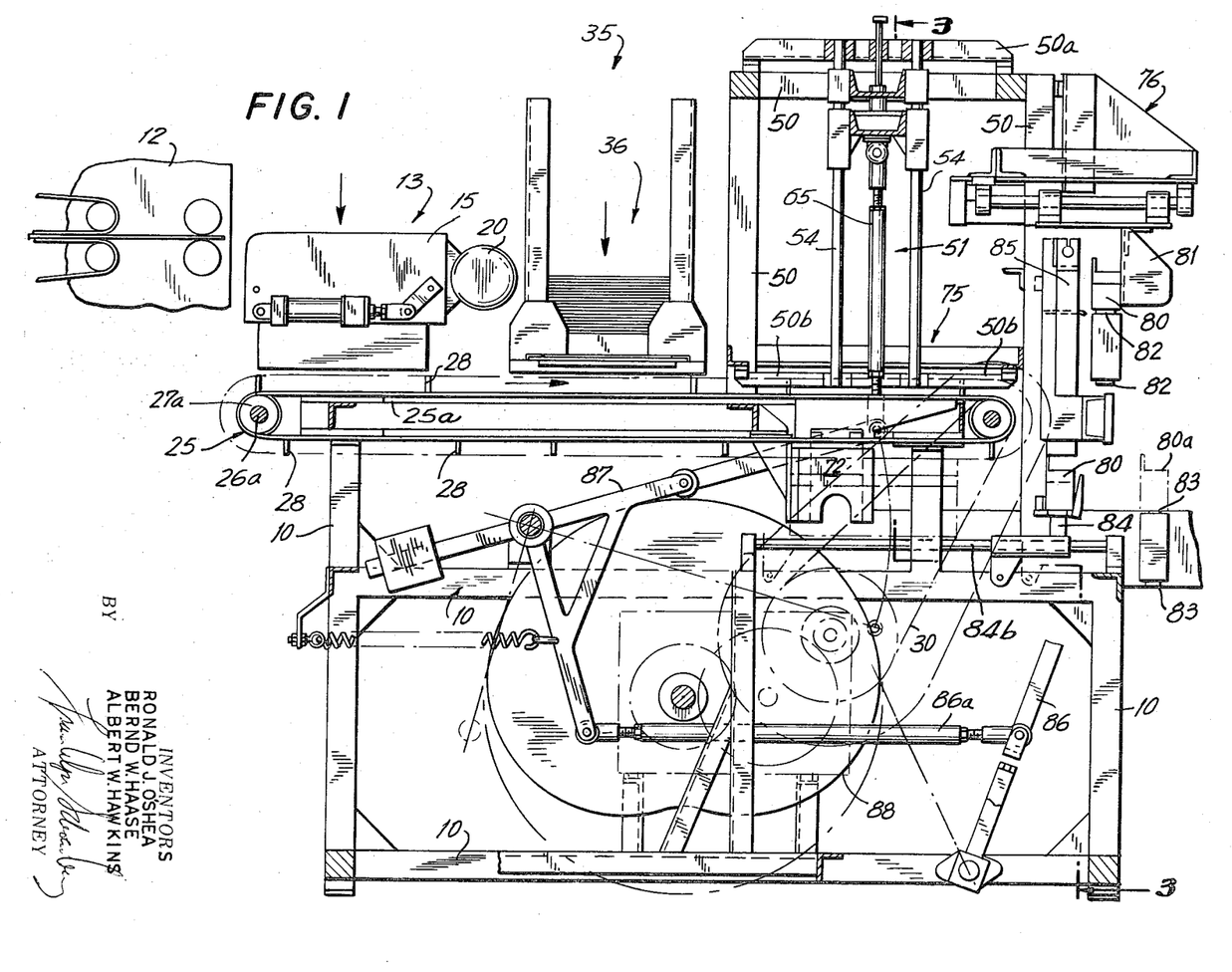
FIG. 1 is a side elevation view, part in section and part in phantom, of one embodiment of the apparatus of the present invention in an assembly having two parallel operating embodiments of said apparatus performing the same function.
Figure 2:
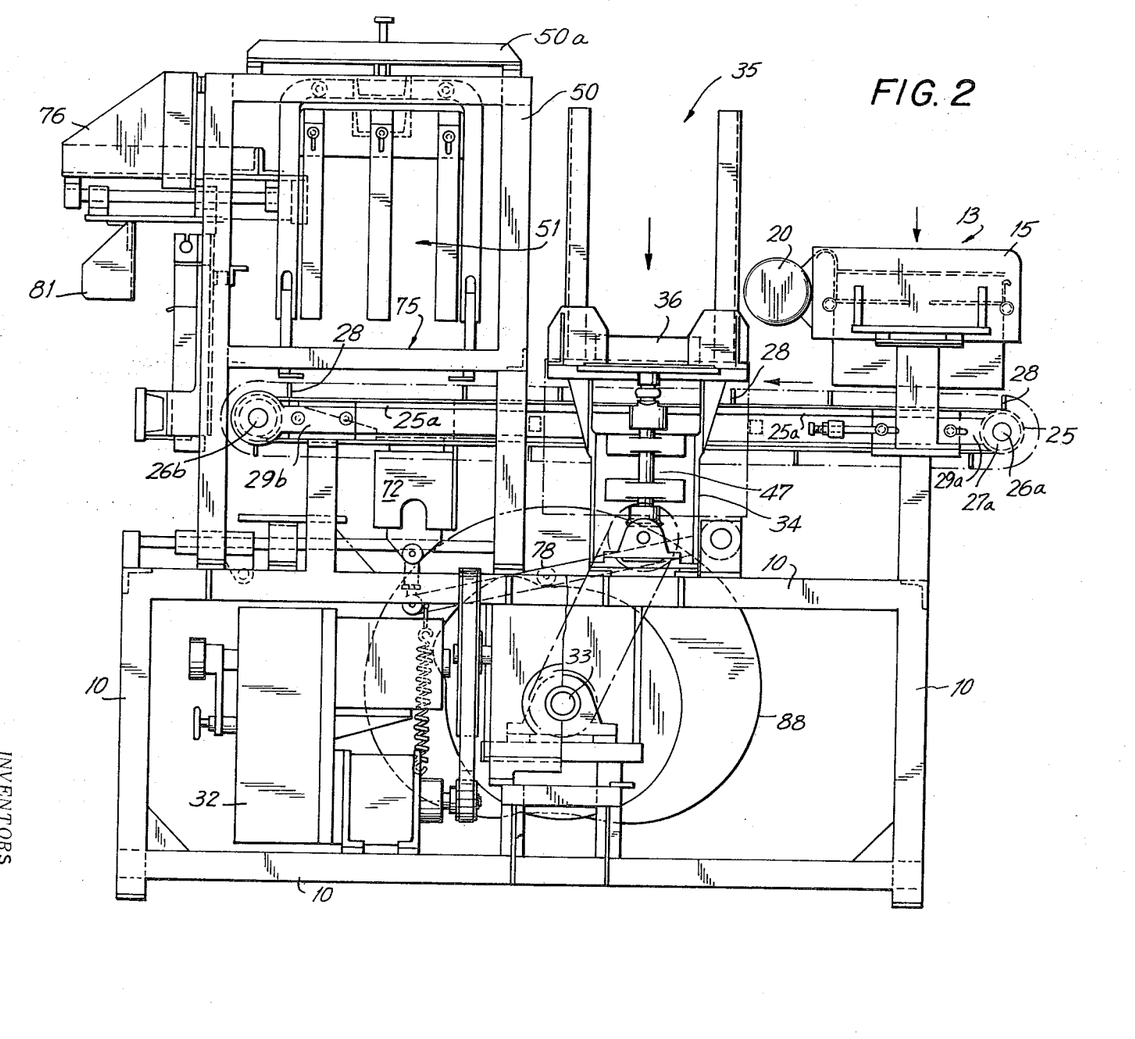
FIG. 2 is a side elevation view, part in section and part in phantom, of the apparatus of FIG. 1.
Figure 5:
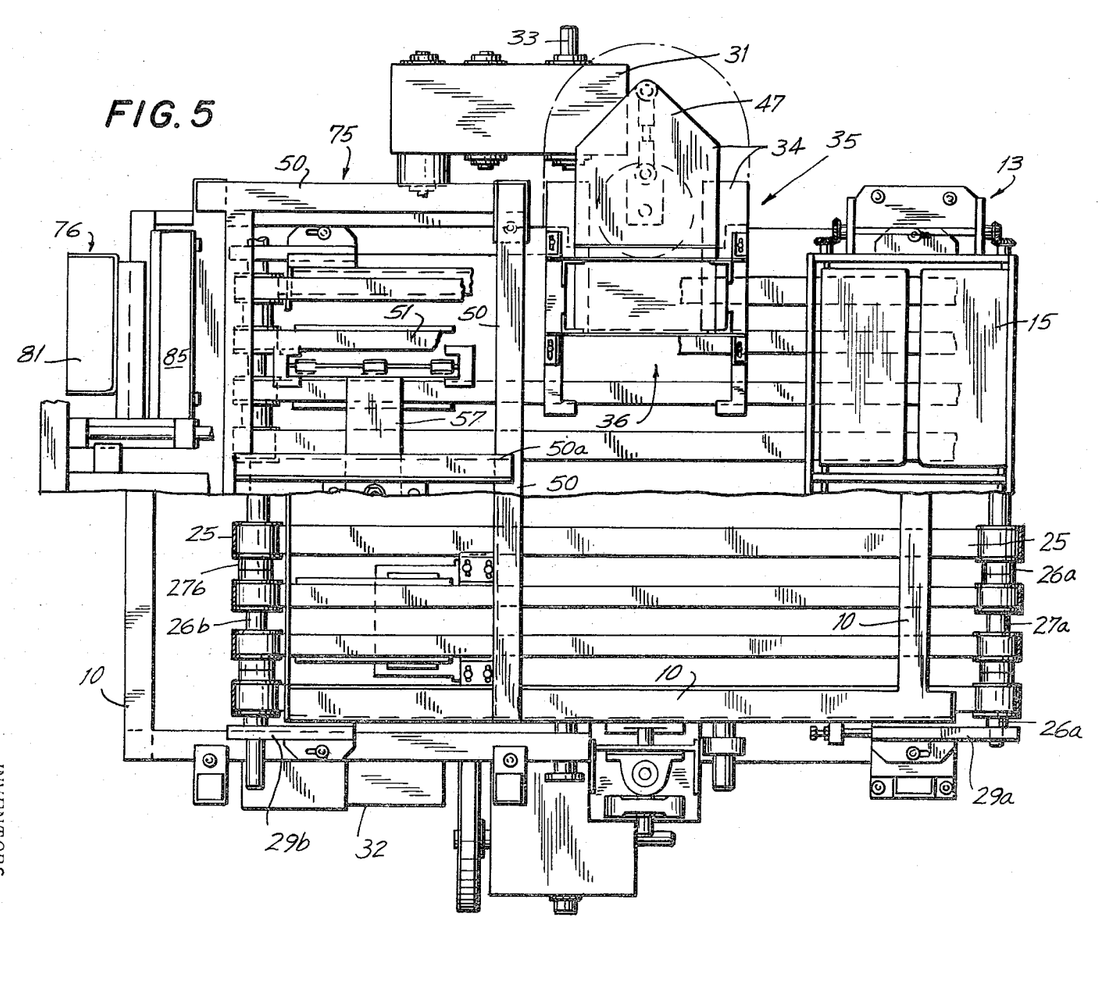
FIG. 5 is a plan view, part in section, taken through lines 5—5 in FIG. 3.

Turning now to the drawing wherein like reference numerals denote like parts, there is shown in FIGS. 1, 2, 3, 4 and 5 a general assembly of one embodiment comprising two packaging machines that operate in concert and incorporate the essential features of the present invention. In the packaging machine assembly there is provided a base support frame 10. Stack collector 15 is mounted at the collecting or fore end of said frame 10 on brackets not shown, in an attitude adjacent to and aligned with a completed bag dispenser 12. A plurality of spaced parallel endless belts 25 trained about belt pulleys 27a and 27b mounted on cross-shafts 26a and 26b, respectively, and having belt frame supports 25a support the upward facing portion of said belts 25 form a substantially horizontal movable platform always advancing between the stack collecting station shown generally as 13 at the fore end of said frame 10 and the carton loading station shown generally as 75 at the aft end of said frame 10. Cross-shafts 26a and 26b are journaled at their ends in suitable end bearings in brackets 29a and 29b (FIGS. 2 and 5). Endless belts 25 are conveyed over a predetermined path the top surface thereof always advancing from belt pulley 27a to belt pulley 27b by engagement of cross-shaft 26b with drive chain 30 driven by "Geneva" indexing mechanism 31 mounted on support frame 10. The "Geneva" indexing mechanism is actuated by drive motor 32 and gear box 32a mounted on support frame 10 through main cam-shaft 33 secured in suitable bearings on frame 10 between gear box 32a and "Geneva" indexer 31.

Secured to endless belt 25 are a plurality of outward extending pins 28 that serve as fore and trailing guides for articles deposited on said belts 25. Side guides 25b are mounted along the sides of belt support frame 25a and serve as side guides for articles conveyed on endless belts 25.

Stiffening member dispenser assembly shown as 36 is mounted on support brackets 34 secured to and above base support frame 10 at stiffening member depositing station shown generally as 35. Mounted on frame 50, which is secured to and above base support frame 10 at carton loading station shown generally as 75, is bag stuffer assembly shown generally as 51 and empty carton feeder shown generally as 76.

Figure 6:
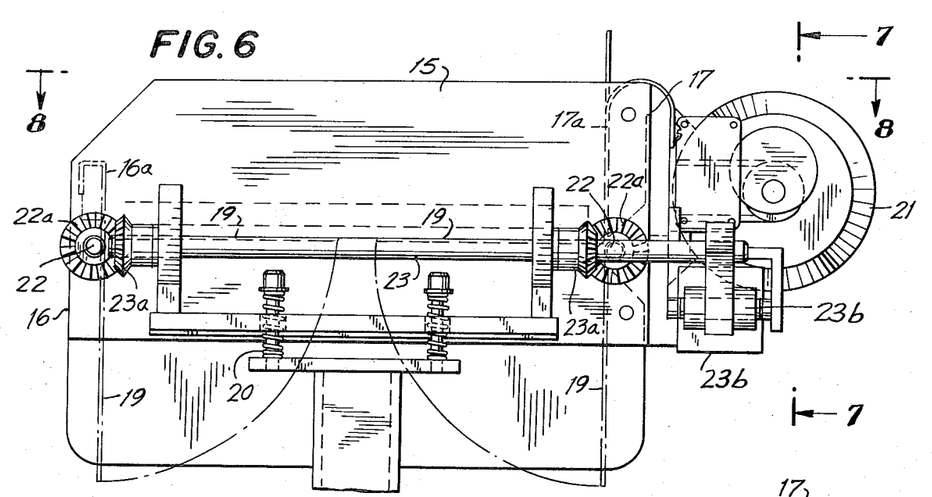
FIG. 6 is an enlarged side elevation view, part in phantom, illustrating a stack collector of the apparatus of FIGS. 1–5.
Figure 7:
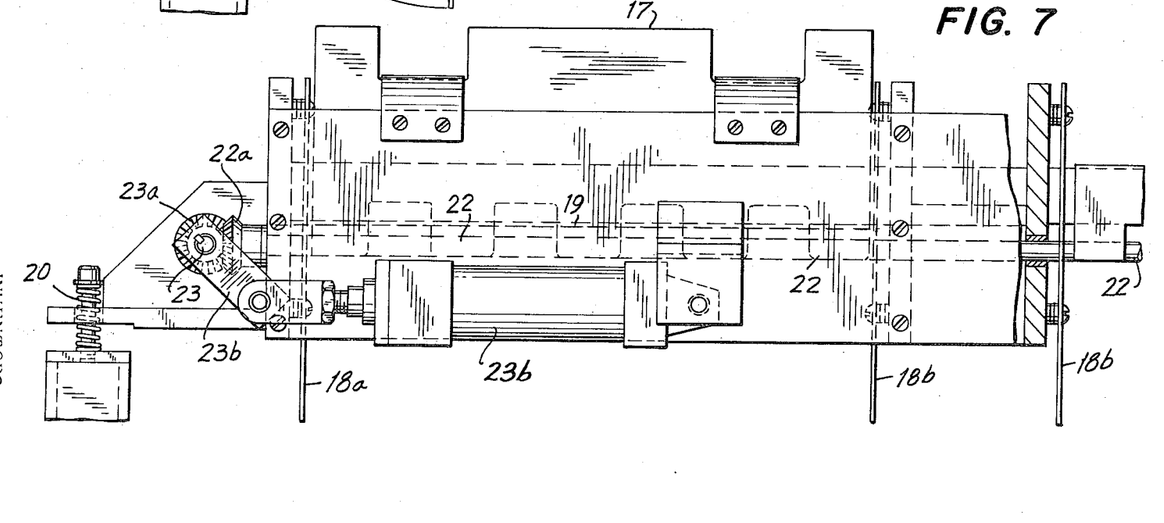
FIG. 7 is an end elevation view in section taken through lines 7—7 of FIG. 6.
Figure 8:
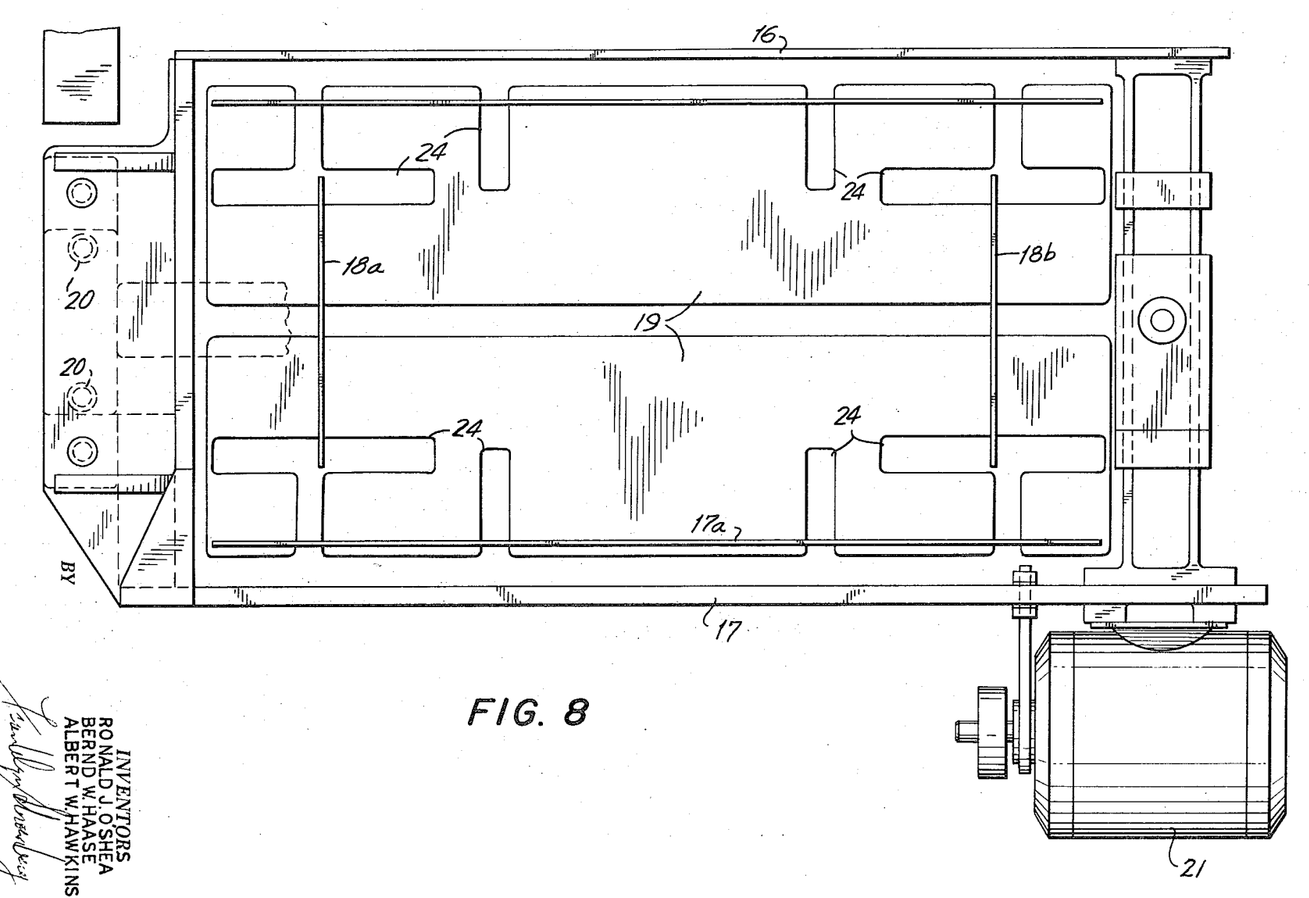
FIG. 8 is an enlarged plan view of a stack collector of the apparatus of FIGS. 1–5 taken through lines 8—8 of FIG. 6 illustrating means for varying the internal dimensions thereof.

Referring now to FIGS. 6, 7 and 8, stack collector 15 comprises front wall 16, adjustable front wall or front stop 16a, rear wall 17, adjustable rear wall or rear stop 17a, adjustable side walls 18a and 18b and openable bottom closure formed by pivotally mounted gates 19. Rear wall 17 is pivotally mounted so it may be vibrated and stack collector 15 is mounted on springs 20 with motor 21 supplying vibratory excitation for said spring mounted stack collector 15 and rear wall 17. Bottom closure forming gates 19 are secured to rotatably mounted shafts 22 with gears 22a mounted at one end of each shaft 22. Rotatably mounted shaft 23 has gears 23a secured at each end thereof which engage gears 22a on shafts 22. Shaft 23 is pivotably secured to activating cylinder 23b. In FIG. 8 is shown key slots 24 which are employed in the adjustment of adjustable front wall 16a, rear wall 17a and side walls 18a and 18b.

Figure 3:
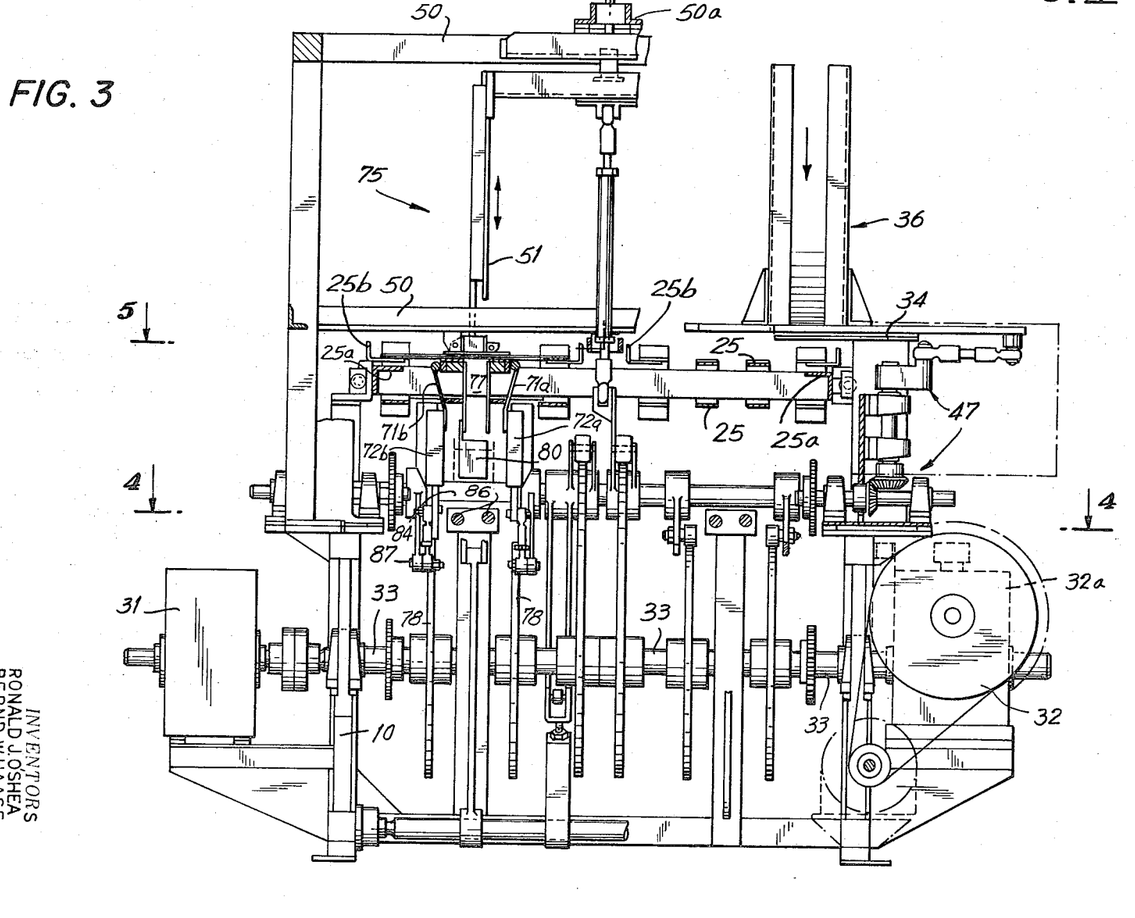
FIG. 3 is an end elevation view taken through lines 3—3 in FIG. 1.
Figure 4:
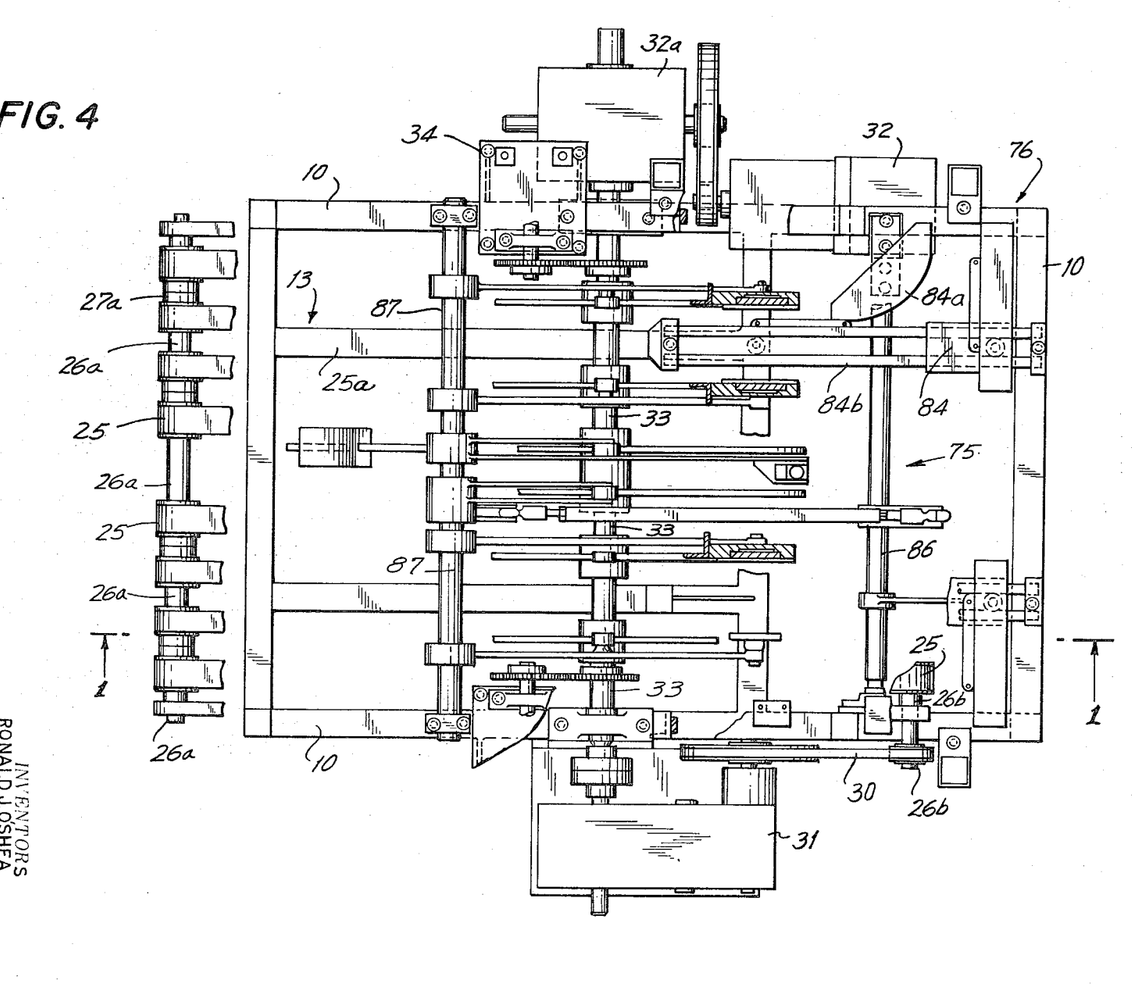
FIG. 4 is a plan view, part in section, of the lower portion of one embodiment of the apparatus of the present invention taken through lines 4—4 in FIG. 3.
Figure 9:
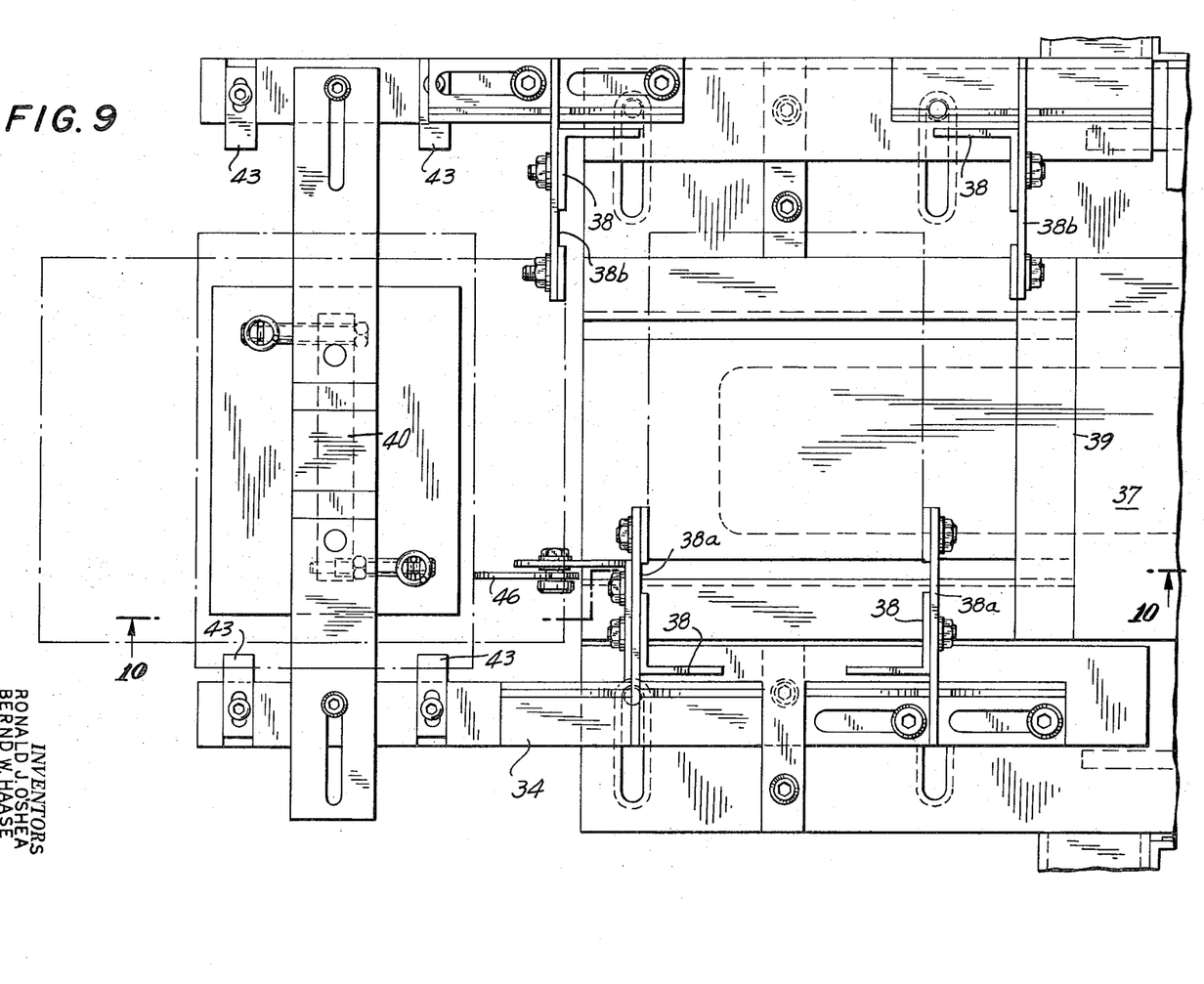
FIG. 9 is an enlarged plan view, part in section and part in phantom, of the stiffening member assembly of the apparatus of FIGS. 1–5.
Figure 10:
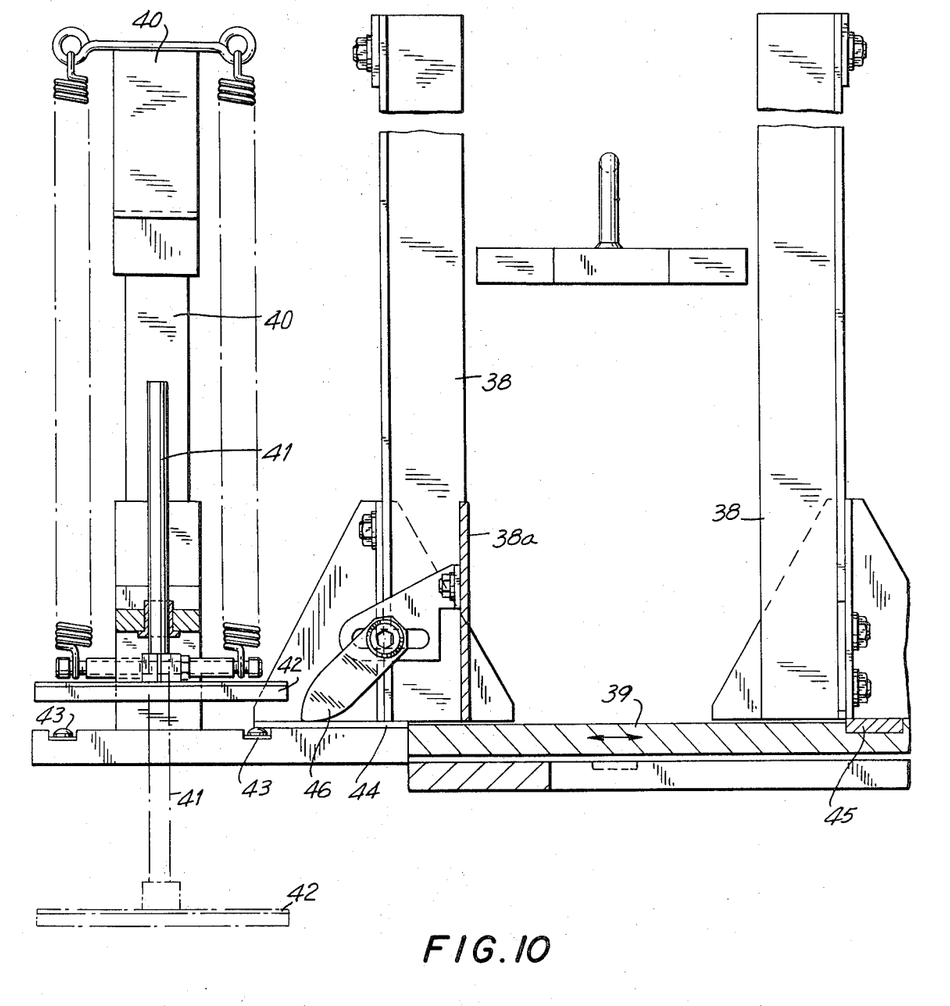
FIG. 10 is an enlarged end elevation view taken through lines 10—10 of FIG. 9.

In FIG. 9 is shown a plan view of stiffening member depositing assembly 36 and in FIG. 10 is shown an end elevation of assembly 36 taken through lines 10—10 of FIG. 9. A stiffening member stack column 37 is formed by four metal angles 38 vertically secured at their bottom to brackets 38a and 38b mounted on support bracket 34. Stripper plate 39 movably mounted on support bracket 34 forms the bottom closure of stack column 37. Brackets 38a and 38b may be adjusted to accommodate different sizes of stiffening members and FIG. 9 illustrates bracket 38a as being adjusted to accommodate the smallest size of stiffening member and bracket 38b as being adjusted to accommodate the largest size of stiffening member. Generally the stiffening members, for example, uniform pieces of cardboard will be rectangular in shape and brackets 38a and 38b would be adjusted to form a stack column of regular dimensions. Adjacent said stack column 37 are mounted on bracket 34 stiffening member support tabs 43 in position to support a single stiffening member stripped from the stack in stack column 37. An actuator cylinder 40 is vertically mounted adjacent stack column 37 and above bracket 34 centrally aligned with the area defined by support tabs 43 with pusher plate rod 41 extending downwardly therefrom and pusher plate 42 secured to the free end thereof. Stripper plate 39 is reciprocated horizontally by crank and slide mechanism 47 (FIGS. 3 and 5) connected to the main motor drive 32 through bevel gears and a chain and sprockets (FIG. 3).

Figure 11:
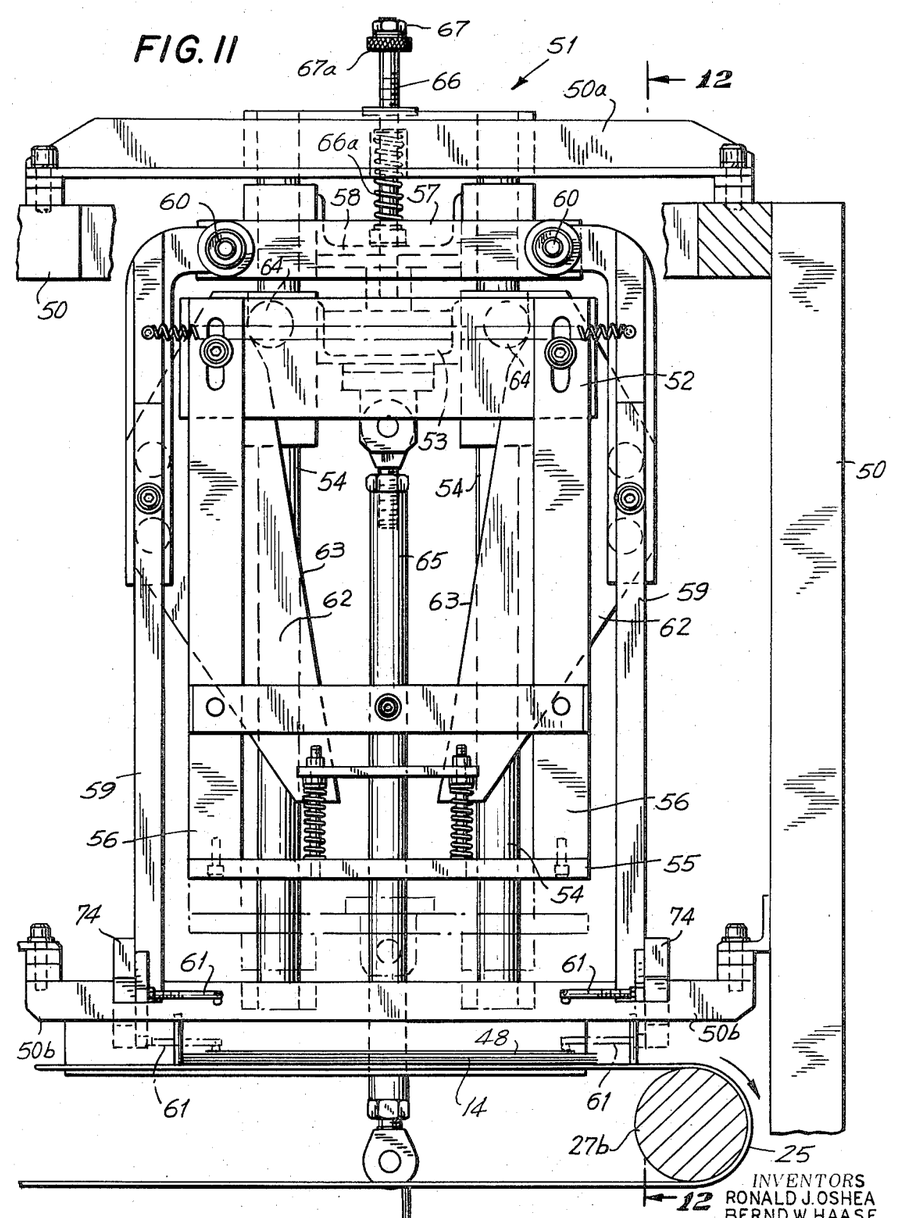
FIG. 11 is an enlarged side elevation view, part in section and part in phantom, of the stack stuffing assembly of the apparatus of FIGS. 1–5.
Figure 12:
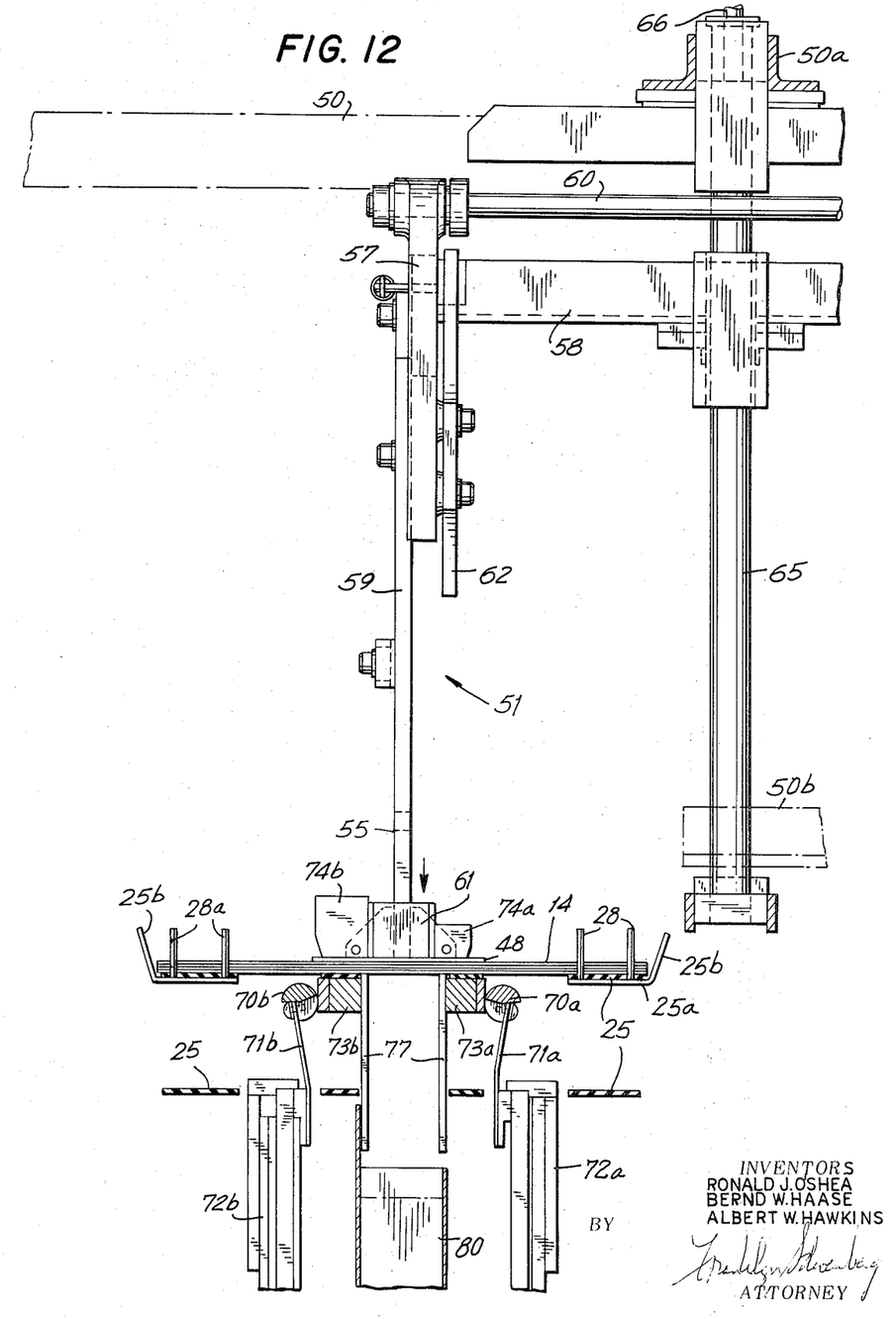
FIG. 12 is an enlarged end view, part in section and part in phantom taken through lines 12—12 of FIG. 11.

Referring now to FIGS. 11 and 12 wherein is illustrated carton stuffer assembly 51 shown generally at carton loading station 75 in FIGS. 1–5.

Stuffer head 52 is secured to stuffer head cross bar 53 which is slideably mounted on vertical guide rods 54 secured at their ends between frame bridges 50a and 50b. Stuffer connecting rod 65 is pivotally secured to stuffer head cross bar 53 intermediate guide mountings in cross bar 53 through which vertical guide rods 54 traverse. Stuffing bar 55 is secured between the lower ends of stuffing bar arms 56 which are secured at the ends of stuffer head 52 and downwardly extending therefrom. Fold tab head 57 is secured to tab head cross bar 58 which is slideably mounted on vertical guide rods 54. Tab head cross bar 58 and fold tab head 57 are disposed just above stuffing bar cross head 53 and stuffer head 52 but separably mounted therefrom.

Folding tab arms 59 are pivotally mounted at each end of tab head 57 on pivot rods 60 and extend freely downwardly therefrom outboard of stuffing bar arms 56. Folding tab feet 61 are secured at the bottom end of folding tab arms 59 in a horizontal position and extending inwardly therefrom. Mounted in a vertical plane intermediate the ends of folding tab arms 59 and inwardly disposed therefrom are tab arm cams 62 with tab arm cam tracks 63 extending along the inside vertical surface thereof. Cam follower rollers 64 are rotatably mounted at the ends of stuffer head 52 and engage each of the tab arm cam tracks 63.

Guide pin 66 is slideably secured in a vertical disposition through bridge frame 50a and is secured at its lower end in the top of tab head cross bar 58. Stop nut 67 and stop nut washer 67a are adjustably secured to the top end of guide pin 66. Compression spring 66a is sheathed about guide pin 66 and interposed between frame bridge 50a and tab head cross bar 58.

The adjustable clearance between stop washer 67a on the end of guide pin 66 and the top surface of frame bridge 50a serves to limit the vertical travel of folder tab head 57 and tab feet 61 secured at the bottom end of folder tab arms 59 and compression spring 66a serves to apply a controlled minimal positive pressure between folding tab feet 61 and the articles upon which said feet 61 are positioned. When stuffer bar 55 and stuffer arms 56 are actuated to stuff articles in an empty carton, cam follower roller 64 mounted on stuffer head 52 engages tab arm cam tracks 63 and urges tab arms 59 outwardly withdrawing tab feet 61 from the surface of the articles upon which tab feet 61 were positioned.

Stuffer assembly 51 is positioned and operates above the horizontal platform formed by endless belts 25 at carton loading station 75 with only stuffer bar 55 and the lower portion of stuffer arms 56 to which said bar 55 is secured descending between endless belts 25 during the stuffing of folded articles into an empty carton positioned therebelow. Stuffer connecting rod 65 pivotally connected at one end to stuffer head cross bar 53 is connected at its other end to connecting rods and levers mounted on support frame 10 below endless belts 25 (FIGS. 1-5) for actuation of the carton stuffing operation.

Adjustments in stuffing assembly 51 can be readily made to accommodate various sizes of articles and thickness of stacks of article, as, for example, by varying the length of stuffer arms 56 and fold tab arm 59, by adjusting stop nut 67 and stop nut washer 67a and by other adjustments or modifications that would be obvious to those skilled in the art.

Figure 13:
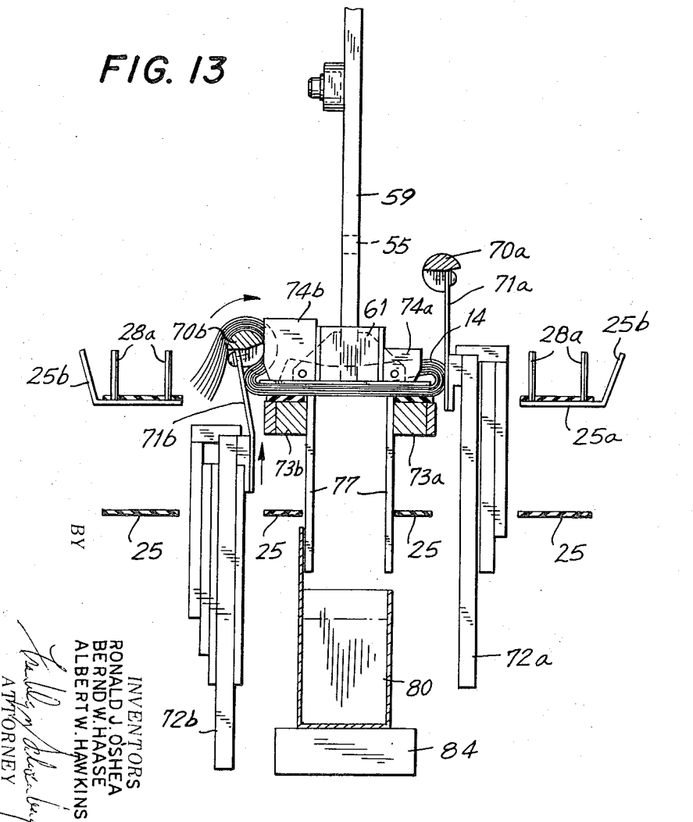
FIGS. 13 and 14 are enlarged fragmentary end views, part in section, illustrating in sequential steps folding a stack of bags and stuffing a folded stack of bags into an empty carton.
Figure 14:
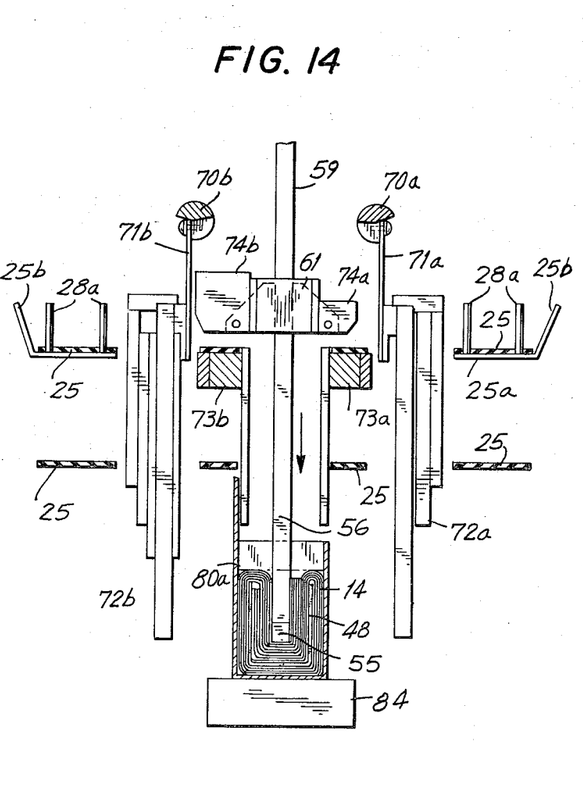

In FIGS. 12, 13 and 14 are illustrated means for folding flat flexible articles positioned on the endless belts 25. In the particular embodiment illustrated in the drawing, the folding means are located at carton loading station shown generally as 75 in FIGS. 1-5 where said folding means are operated in conjunction with stuffer assembly 51.

Folding bars 70a and 70b are mounted in a horizontal position on plate springs 71a and 71b which are secured to folding bar slide plates 72a and 72b, respectively. Folding bar slide plates 72a and 72b are slideably mounted astride chute guide plates 77 at carton loading station 75 and guide the vertical ascent and descent of folding bars 70a and 70b between endless belts 25 while maintaining the horizontal disposition of said folding bars 70a and 70b. Snap cams 73a and 73b are secured on the outside surface of each of chute guide plates 77 immediately below endless belts 25 and belt frame 25a. Snap cams 74a and 74b are secured to the outside surface of each of fold tab arms 59 at the lower end thereof.

Fold tab feet 61 of stuffer assembly 51 are positioned on the opposing edges of a stack of articles 14 and stiffener card 48 covering a portion of the surface thereof (FIGS. 11-13). Slide plate 72a is pushed upwards rapidly being guided by slide plate 72a kept under tension by plate spring 71a as folding bar 70a bears on the surface of snap cam 73a and then snap cam 74a. Folding bar 70a engages an unrestrained portion of the stack of articles 14 from the underside and then throws over said stack portion onto the portion of the stack 14 covered by stiffener card 48 and restrained by fold tab feet 61 when dropping off snap cam 74a bearing surface at the end of its upward travel. Slide plate 72b is then pushed upwards being guided by said slide plate which is kept under tension by plate spring 71b as folding bar 70b bears on the surface of snap cams 73b and 74b in its upward travel. Folding bar 70b engages and then throws over a portion of the unrestrained stack of articles 14 onto the portion of stack 14 covered by the first folded portion of said stack. The folded stack of bags are now ready to be stuffed through chute 77 into an aligned empty carton therebelow by stuffer assembly 51.

FIGS. 12-14 show the apparatus with snap cams 73 and 74 of different sizes and configuration which illustrate the modifications that can be made to adjust for variations in the size of articles in the stack, the thickness of the stack and the size of the stiffening member if one is used.

Referring now to FIGS. 1-5 wherein is illustrated means for conveying an empty carton 80 from a continuous conveyor of empty cartons 82 to the carton loading station 75 and means for conveying a filled carton 80a away from said carton loading station 75.

Conveyor belt 82 provides a continuous source of empty cartons 80 to the apparatus of the present invention. Carton pusher 81 actuated by pusher mechanism 76 mounted on support frame 50 pushes empty carton 80 from said conveyor 82 into empty carton chute 85 vertically aligned with shuttle carrier 84. Shuttle carrier 84 has a pivotally mounted carrier plate upon which the empty carton is deposited from chute 85. Shuttle carrier 84 is slideably mounted on horizontally disposed guide rods 84b and secured at its bottom to shuttle lever drive means shown generally as 86. Shuttle carrier guide rods 84b are secured on support frame 10 below endless belts 25 and extend from the aft end of said frame 10 to carton loading station 75. Shuttle carrier cam guide 84a is mounted on frame 10 so as to engage the pivotally mounted carrier plate of shuttle carrier 84 upon which the empty carton 80 is deposited and rotate said plate and the carton resting thereon 90° as shuttle carrier 84 is transported from beneath chute 85 to the carton loading station 75 immediately below stuffer chute 77. Empty carton 80 resting on shuttle carrier plate is axially and vertically aligned with carton loading chute 77 at carton loading station 75 and is available to receive articles stuffed through said chute 77 by stuffer assembly 51. Shuttle carrier 84 with filled carton 80a thereon is transported back to its station beneath chute 85, cam guide 84a rotating the pivotally mounted plate on which carton 80a is positioned 90° as shuttle carrier 84 is conveyed from carton loading station 75. Filled carton 80a is ejected from shuttle carrier 84 onto take-away conveyor 83.

A typical operation of a preferred embodiment of the apparatus of the present invention will now be described and will be more readily understood when considered together with FIGS. 1-14.

In operating the packaging machine of the present invention the fore end of said machine is positioned adjacent to a completed bag dispenser 12 working in conjunction with one or more bag forming machines, stack collector 13 being disposed in horizontal alignment with said dispenser 12. The bag dispenser 12 has bag counting means, not shown, that is electrically coordinated with the automatic cycle control device, not shown, for the packaging machine of the present invention. In normal start position the stack collector bottom closure 19 is closed, endless belts 25 are stopped with belt pins 28 on each of said belts 25 defining a section on said belts between which a stack of articles 14 will be deposited; the rod end of air cylinder 40 is pressurized with pusher plate rod 41 at the top of its station; stuffing assembly is at the top of its station; a stack of stiffening members 48, for example, a stack of individual uniformly sized pieces of cardboard are loaded into stack column 37 with stripper plate 39 positioned thereunder to form the bottom closure thereof; and a continuous line of empty cartons 80 are in place on conveyor 82 with several empty cartons in chute 85. The vibration excitation motor 21 is turned on and the automatic cycle switch, not shown, is activated.

Bag dispenser 12 is activated and finished bags 14 are dispensed into stack collector 15 where they are deposited in an aligned stack by the action of vibrating wall 17 and the vibration of stack collector 15. When a desired quantity of bags have been dispensed to stack collector 15, the dispensing action is interrupted and the bottom closure gates 19 of collector 15 open depositing an aligned stack of bags on endless belts 25. The bottom closure gates 19 close, the bag dispenser 12 starts up again and endless belts 25 are activated for conveying the aligned stack of bags 14 to the stiffening member depositing station 35 immediately below dispenser pusher plate 42 (FIG. 10) by drive chain 30 that is activated by drive motor 32 through main cam-shaft 33 and "Geneva" indexer 31. When the aligned stack of bags 14 on endless belts 25 reach depositing station 35 "Geneva" indexer stops drive chain 30 permitting endless belts 25 to dwell at this station and crank and slide mechanism 47 at depositing station 35 is actuated. Stripper plate bar 45 is mounted in the top surface of stripper plate 39 with a portion equal to about one-half the thickness of the stiffening member projecting above the flat, horizontal surface of stripper plate 39. Crank and slide mechanism 47 pushes stripper plate 39 under the inside wall of stack column 37 and under pivotally mounted stripper finger 46 in a direction transverse to the direction of travel of endless belts 25. Stripper plate bar 45 mounted in stripper plate 39 engages the edge of the stiffening member 48 in stack column 37 as stripper plate 39 is horizontally traversed. Dislodged stiffening member 48 is conveyed to a position below pusher plate 42 where said stiffening member 48 is stripped from the surface of stripper plate 39 by stripper finger 46 and deposited on support tabs 43 as stripper plate 39 is withdrawn by slide mechanism 47. The rod end of air cylinder 40 is exhausted and the head end is pressurized activating the vertical downward movement of rod 41 and pusher plate 42 which pushes stiffening member 48 from support tabs 43 and deposits said member 48 on a portion of the top surface of an aligned stack of bags 14 carried on endless belts 25.

The rod end of cylinder 40 is pressurized, the head end being exhausted and pusher rod 41 and pusher plate 42 are withdrawn to the top of their station. Drive chain 30 is again activated and endless belts 25 with an aligned stack of bags resting thereon are advanced to carton loading station 75. When endless belts 25 convey bags 14 to carton loading station 75 drive chain 30 is again stopped and endless belts are permitted to dwell at this station. Trailing pins 28 mounted on endless belts 25 urge stack of bags 14 against bag stop pins 28a at carton loading station 75 thereby positioning said stack of bags immediately below stuffing assembly 51 and over stuffing guide chute 77.

When the aligned stack of bags are at rest on belts 25 at carton loading station 75 carton shuttle drive 76 is activated and carton shuttle plate 84 having an empty carton 80 deposited thereon is conveyed to an indexed position immediately below and in axial and vertical alignment with guide chute 77 mounted on frame 10 between endless belts 25 (FIGS. 12-14). Carton shuttle 84 dwells at this station until bag folder mechanism and stuffer assembly 51 have completed their cycle.

Stuffer assembly 51 is activated so that fold tab feet 61 at the ends of fold tab arms 59 rest on the opposing edges of the aligned stack of bags 14. Folder slide plate 72a is then activated to push up folding bar 70a and fold one portion of bag stacks 14 over the portion covered by stiffening member 48. Folder slide plate 72b is then activated raising folding bar 70b to complete the folding of bags 14 about stiffening member 48. Upon completion of the folding operation stuffer head 52 of stuffer assembly 51 is drawn downwardly by stuffer connecting rod 65. The downward travel of stuffer head 52 urges fold tab arms 59 outwardly dislodging fold tab feet 61 off the opposing edges of folded bags 14. Stuffer bar 55 then engages the stack of folded bags 14 on belts 25 and folds and stuffs said stack of bags through chute guide plates 77 into empty carton 80 resting immediately therebelow as is shown sequentially in FIGS. 12, 13 and 14. Stuffer connecting rod 65 is then forced upwardly withdrawing folding bar 52 from carton 80 until stuffer assembly 51 is raised to the top of its station.

Upon withdrawal of stuffer bar 55, carton shuttle 84 is withdrawn from the carton loading station 75 and conveyed back to the station under carton chute 85, whereat, by means not shown, the filled carton is ejected from carton shuttle 84 onto carton conveyor 83 (FIGS. 1-5).

From the foregoing, it will be seen that the present invention provides a packaging machine that is suitable for and capable of automatically collecting a desired number of flat, flexible articles in a stack and then automatically loading said stack into an empty dispensing carton. It will be readily appreciated by those skilled in the art that apparatus of this general type are capable of collecting and cartoning stacks of flexible articles that are in film or sheet form, are fabricated into bags or other flat configurations, are unfolded or prefolded either partially or completely and the apparatus and method are suitable for use with a variety of sizes of articles.

What is claimed is:

1. Apparatus for automatically loading a desired quantity of flat, flexible articles into a dispensing carton comprising in combination:
    a. a stack depositing station comprising means for collecting and depositing in an aligned stack a plurality of flat, flexible articles, said means being adjustable to collect articles of varying sizes;
    b. a carton loading station associated with stack depositing station and aligned with a conveying means;
    c. conveying means comprising a movably mounted endless belt that forms a substantially horizontal movable platform surface extending between said stack depositing station and said carton loading station, said belt having at least one aperture therethrough, said conveying means being adaptable to convey stacks of articles of varying sizes and position said stack in alignment with article folding and carton stuffing apparatus;
    d. means for automatically folding the ends of an aligned stack of flat flexible articles positioned on said conveying means into overlying relationship, said means being adjustable for folding stacks of articles of varying sizes;
    e. means for automatically stuffing a folded stack of flexible articles positioned on said conveying means at said carton loading station into an empty carton.

2. The apparatus of claim 1 wherein said conveying means is a plurality of spaced, parallel movably mounted endless belts having guide means for aligned stacks of articles of varying sizes.

3. The apparatus of claim 1 comprising means for automatically collecting a desired quantity of flat, flexible articles in an aligned stack and then depositing said aligned stack on said conveying means.

4. The apparatus of claim 1 comprising means for depositing a flat stiffening member over a portion of the top surface of an aligned stack of flat, flexible articles positioned on said conveying means at a station intermediate said stack depositing station and said carton loading station, said stiffening member depositing means being adjustable to deposit members of varying sizes.

5. The apparatus of claim 4 wherein said automatic folding means comprises means for folding an aligned stack of flat, flexible articles about a stiffening member deposited over a portion of the top surface of said aligned stack of articles.

6. An apparatus for loading a plurality of flat, flexible articles in a dispensing carton comprising in combination:

a. a carton loading station;

b. means for automatically depositing a desired number of flat, flexible articles in an aligned stack at a carton loading station, said means being adjustable for articles of varying sizes;

c. a first means at said carton loading station for folding one end of said stack of articles into overlying relation to the central portion of the stack and second folding means at said carton loading station to fold the other end of the stack in overlying relation to said one end;

d. means for automatically conveying an empty carton to said carton loading station from a conveyor of empty cartons and positioning said empty carton in alignment with said aligned stack of articles;

e. means for automatically stuffing said aligned stack of flexible articles into an empty carton positioned at said carton loading station, said stuffing means being adjustable to stuff articles of varying sizes.

* * * * *